United States Patent
Paiam

(10) Patent No.: US 6,222,958 B1
(45) Date of Patent: Apr. 24, 2001

(54) OPTICAL INTERLEAVER/DE-INTERLEAVER

(75) Inventor: Reza Paiam, Ottawa (CA)

(73) Assignee: JDS Fitel Inc., Nepean (CA)

( * ) Notice: Subject to any disclaimer, the term of this patent is extended or adjusted under 35 U.S.C. 154(b) by 0 days.

(21) Appl. No.: 09/383,069

(22) Filed: Aug. 26, 1999

(30) Foreign Application Priority Data

Jul. 22, 1999 (CA) .................................................. 2278358

(51) Int. Cl.$^7$ ...................................................... G02B 6/28
(52) U.S. Cl. .............................. 385/24; 385/27; 385/42; 359/127; 356/351; 356/352
(58) Field of Search .................. 385/16, 17, 24, 385/39, 42, 47, 27; 359/115, 124, 127–131; 356/345, 351, 352

(56) References Cited

U.S. PATENT DOCUMENTS 5,499,308 * 3/1996 Arai et al. ............................. 385/27
6,055,345 * 4/2000 Ahn et al. ............................. 385/24
6,125,220 * 9/2000 Copner et al. ........................ 385/27

* cited by examiner

*Primary Examiner*—John D. Lee
*Assistant Examiner*—Michelle R. Connelly-Cushwa
(74) *Attorney, Agent, or Firm*—Neil Teitelbaum

(57) ABSTRACT

An interleaver/de-interleaver circuit comprising:
a first coupler having an input port and at least two output ports;
a second coupler having two input ports and two output ports, the at least two output ports of the first coupler being optically coupled with the two output ports of the second coupler;
an optical cavity having a partially reflective surface having a reflectivity E at one end and a reflective surface at another end with a higher reflectivity E', the optical cavity being optically coupled to one of the at least two output ports of the first coupler and at one of the two output ports of the second coupler.

21 Claims, 12 Drawing Sheets

OPTICAL INTERLEAVER/DE-INTERLEAVER

FIELD OF THE INVENTION

This invention relates to generally to a multiplexing/demultiplexing circuit, and more particularly, to a circuit that is suitable for interleaving/de-interleaving channels in an optical system.

BACKGROUND OF THE INVENTION

Using optical signals as a means of carrying channeled information at high speeds through an optical path such as an optical waveguide i.e. optical fibres, is preferable over other schemes such as those using microwave links, coaxial cables, and twisted copper wires, since in the former, propagation loss is lower, and optical systems are immune to Electro-Magnetic Interference (EMI), and have higher channel capacities. High-speed optical systems have signaling rates of several mega-bits per second to several tens of giga-bits per second.

Optical communication systems are nearly ubiquitous in communication networks. The expression herein "Optical communication system" relates to any system that uses optical signals at any wavelength to convey information between two points through any optical path. Optical communication systems are described for example, in Gower, Ed. Optical communication Systems, (Prentice Hall, New York) 1993, and by P. E. Green, Jr in "Fiber optic networks" (Prentice Hall New Jersey) 1993, which are incorporated herein by reference.

As communication capacity is further increased to transmit an ever-increasing amount of information on optical fibres, data transmission rates increase and available bandwidth becomes a scarce resource.

High speed data signals are plural signals that are formed by the aggregation (or multiplexing) of several data streams to share a transmission medium for transmitting data to a distant location. Wavelength Division Multiplexing (WDM) is commonly used in optical communications systems as means to more efficiently use available resources. In WDM each high-speed data channel transmits its information at a pre-allocated wavelength on a single optical waveguide. At a receiver end, channels of different wavelengths are generally separated by narrow band filters and then detected or used for further processing. In practice, the number of channels that can be carried by a single optical waveguide in a WDM system is limited by crosstalk, narrow operating bandwidth of optical amplifiers and/or optical fiber non-linearities. Moreover such systems require an accurate band selection, stable tunable lasers or filters, and spectral purity that increase the cost of WDM systems and add to their complexity. This invention relates to a method and system for filtering or separating closely spaced channels in a manner that would otherwise not be suitably filtered by conventional optical filters.

Currently, internationally agreed upon channel spacing for high-speed optical transmission systems, is 100 Ghz, equivalent to 0.8 nm, surpassing, for example 200 Ghz channel spacing equivalent to 1.6 nanometers between adjacent channels. Of course, as the separation in wavelength between adjacent channels decreases, the requirement for more precise demultiplexing circuitry capable of ultra-narrow-band filtering, absent crosstalk, increases. The use of conventional dichroic filters to separate channels spaced by 0.4 nm or less without crosstalk, is not practicable; such filters being difficult if not impossible to manufacture.

In a paper entitled Multifunction optical filter with a Michelson-Gires-Tumois interferometer for wavelength-division-multiplexed network system applications, by Benjamin B. Dingle and Masayuki Izutsu published 1998, by the Optical Society of America, a device hereafter termed the MGTI (Michelson-Gires-Tournois Interferometer) device provides some of the functionality provided by the instant invention. For example, the MGTI device as exemplified in FIG. 1$a$ serves as a narrow band wavelength demultiplexor; this device relies on interfering a reflected E-field with an E-field reflected by a plane mirror 16. The etalon 10 used has a 99.9% reflective back reflector 12$r$ and a front reflector 12$f$ having a reflectivity of about 10%; hence an output signal from only the front reflector 12$f$ is utilized. A beam splitting prism (BSP) 18 is disposed to receive an incident beam and to direct the incident beam to the etalon 10. The BSP 18 further receives light returning from the etalon and provides a portion of that light to the plane mirror 16 and a remaining portion to an output port. Although the MGTI device appears to perform its intended function, it appears to have certain limitations. For example, the MGTI device requires an optical circulator to extract the output signal adding to signals loss and increased cost of the device; and the requirement of a BSP which is known to have a significant polarization dependent loss. FIG. 10 shows a graph with a linear plot of the phase difference between the two reflected E-fields from the GT and from a mirror with an optical path difference.

A wavelength interferometer can be made using a Mach-Zehnder interferometer(MZI). Notwithstanding, the spectral response of the MZI is sinusoidal and consequently does not have a desired flat-top characteristic passband; hence, its spectral window for low crosstalk, is small.

A paper by K. Oda et al., entitled "A wide-band guided-wave periodic multi/demultiplexer with a ring resonator for optical FDM transmission systems, JLT, vol. 6, no. 6, pp 1016–1022, June 1988, discloses improving the spectral response of the MZI and a suitable step-like response can be obtained by adding an all-wave filter such as a ring resonator to one arm of the MZ as is shown in FIG. 1. However, it is generally difficult to implement a low-loss ring resonator in a system having a free-spectral range (FSR) of 100 GHz or 50 Ghz.

The instant invention obviates the problems associated with the bulk optics GT device described heretofore, and obviates a device requiring a ring resonator.

It is an object of this invention to provide embodiments of the invention, some of which are planar waveguide implementations for a wavelength interleaver based on an MZ interferometer.

It is a further object of the invention to provide an interleaver that uses an asymmetric MZ combined with a suitable resonator disposed on the shorter arm of the MZ. Advantageously, the use of a planar waveguide MZ interferometer allows the setting of a required length difference between two arms of the MZ, very accurately.

SUMMARY OF THE INVENTION

In accordance with the invention, there is provided, a first coupler having an input port and at least two output ports;
 a second coupler having two input ports and two output ports, the at least two output ports of the first coupler being optically coupled with the two output ports of the second coupler;
 an optical cavity having a partially reflective surface E at one end and a reflective surface at another end with a higher reflectivity E', the optical cavity being optically coupled to one of the at least two output ports of the first coupler and at one of the two output ports of the second coupler.

In accordance with the invention there is further provided, an interleaver/de-interleaver circuit comprising:

a Mach-Zehnder interferometer having two optical branch paths between two 50/50 couplers, one of the two branch paths including an etalon within the path, such that light traversing said one branch path is coupled from one of the couplers to the other after resonating within the etalon, light traversing another of the two branch paths interfering with the light traversing the other branch path within one of the two couplers.

In accordance with the invention, there is still further provided, an interleaver/de-interleaver comprising:

a MZ-interferometer having an input/output port and two output/input ports;

a GT resonator optically coupled with the MZ-interferometer, the GT resonator for providing additional filtering and for lessening the sinusoidal shape of de-interleaved channels.

BRIEF DESCRIPTION OF THE DRAWINGS

Exemplary embodiments of the invention will now be described in conjunction with the drawings in which:

FIG. 18a is an alternative embodiment of the invention wherein only one GT resonator is used; and, FIG. 18b is a detailed view of a portion of the circuit shown in FIG. 18a.

DETAILED DESCRIPTION

Figure 1:
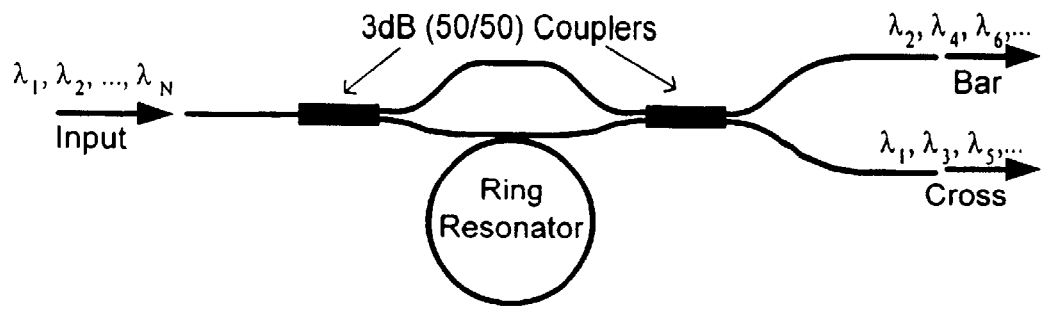
FIG. 1 is a schematic diagram of a prior art wide-band guided-wave periodic multi/demultiplexer with a ring resonator for optical FDM transmission systems.
Figure 1A:
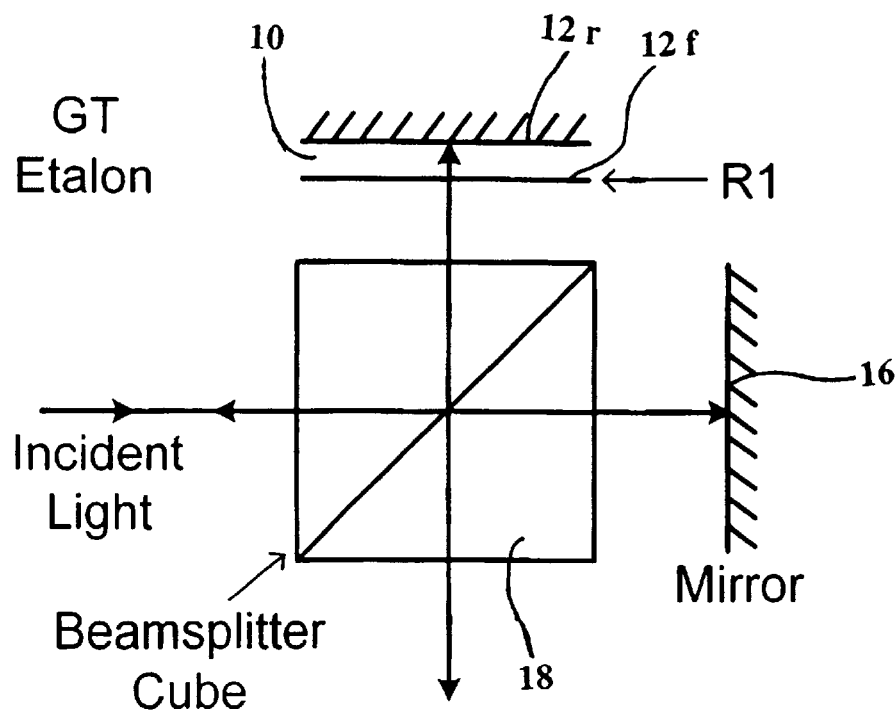
FIG. 1a is a block diagram of an MGTI device.

The prior art circuit of FIG. 1 has an improved response over the use of a known asymmetric Mach-Zehnder interferometer filter, which is sinusoidal in output response. Notwithstanding, it is difficult to implement a low loss ring resonator with 100 GHz or 50 GHz FSR. Another advantage of the MZ interferometer of FIG. 1 is that it obviates the use of circulator, required in a typical bulk optics Michelson interferometer combined with a GT device.

Figure 2:
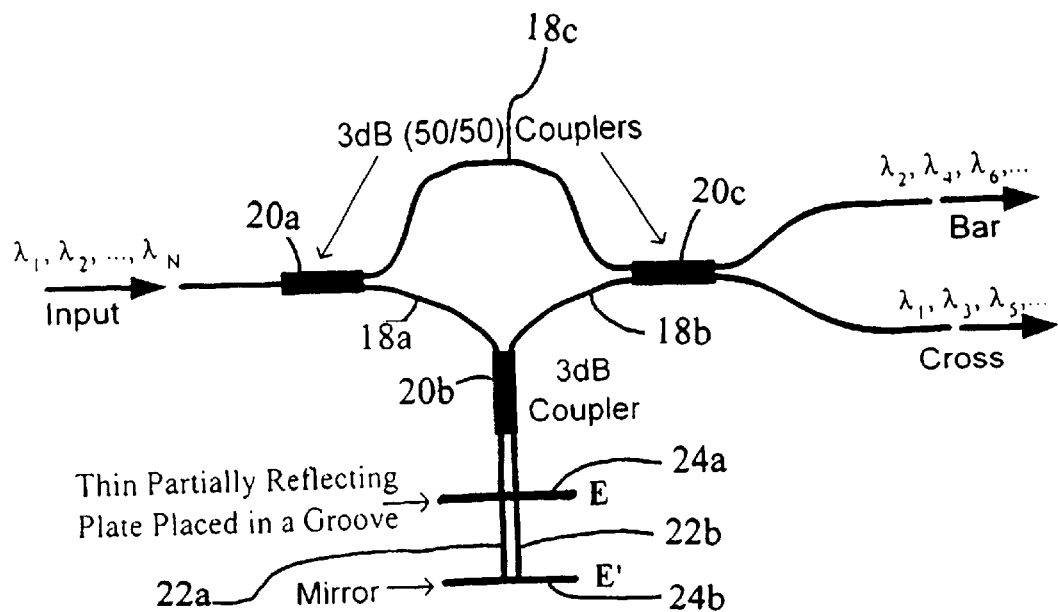
FIG. 2 is a schematic diagram of an embodiment of a WDM interleaver/de-interleaver circuit based on a waveguide MZ-interferometer combined with a GT resonator in accordance with the invention.
Figure 3:
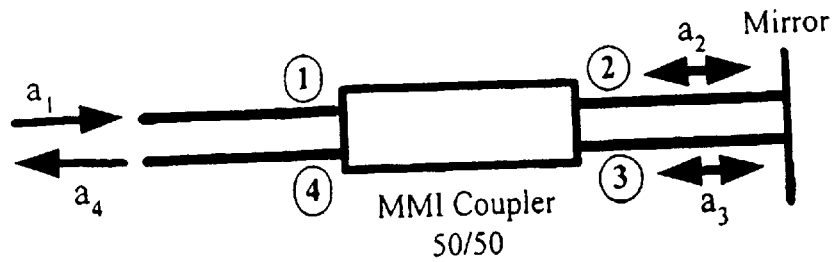
FIG. 3 is a schematic diagram of a 3 dB MMI coupler illustrating diagramatically the functionality of the device.

An embodiment of this invention is shown in FIG. 2 implemented using waveguide technology based on and MZ interferometer combined with a GT resonator. The length of the arms 18a and 18b in combination are of a different length than the arm 18c. A 4-port 3 dB coupler 20b is disposed between arms 18a and 18b optically connecting ports of two 3 dB couplers 20a and 20c. At an end of the 3 dB coupler 20b is GT resonator, which is formed by providing a mirror 24b at one end of two waveguides 22a and 22b and by disposing a partially reflecting plate 24a within a groove across the waveguides 22a and 22b. The mirror has a reflectivity E' and the partially reflecting plate 24a has a reflectivity E<E'. Preferably, the mirror 24b is 100% reflective. The couplers 20a and 20c are both 3 dB couplers. FIG. 3 shows in more detail the functionality of an MMI 3 dB coupler such as 20b having a mirror at ports 2 and 3. It becomes clear after understanding the operation of the 3 dB coupler with a mirror that an optical circulator heretofore required in a Michelson GT resonating device, is not required. The input signal $a_1$ launched into port 1 is divided equally between ports 2 and 3. When signals $a_2$ and $a_3$ are reflected back by the mirror, they are combined into port 4 of the coupler and not port 1. This is due to phase relations in the 3 dB coupler. In this manner the reflected signal from the mirror is separated from the input signal without use of an optical circulator.

Figure 4:
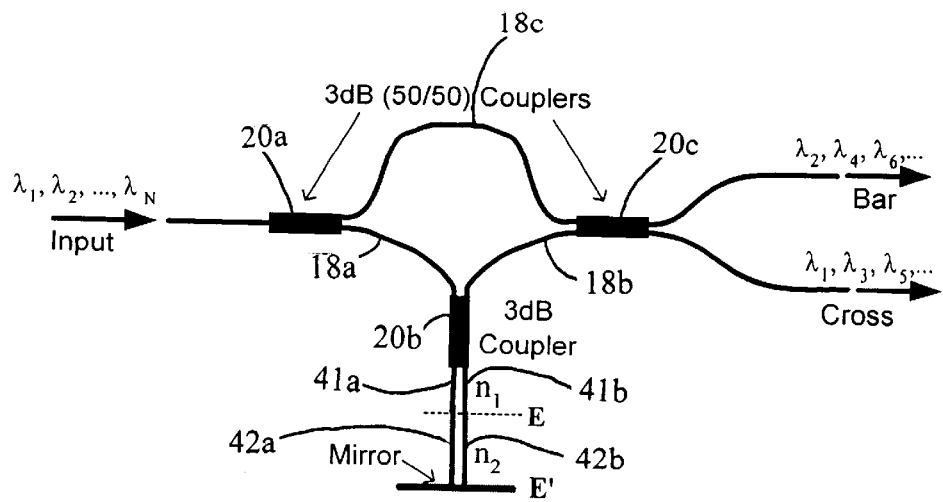
FIG. 4 is a schematic diagram of an alternative embodiment of a WDM interleaver/de-interleaver circuit based on a waveguide MZ-interferometer combined with a GT resonator in accordance with the invention similar to that shown in FIG. 2 however having a resonator made by employing two materials having different refractive indices in the waveguides.
Figure 5:
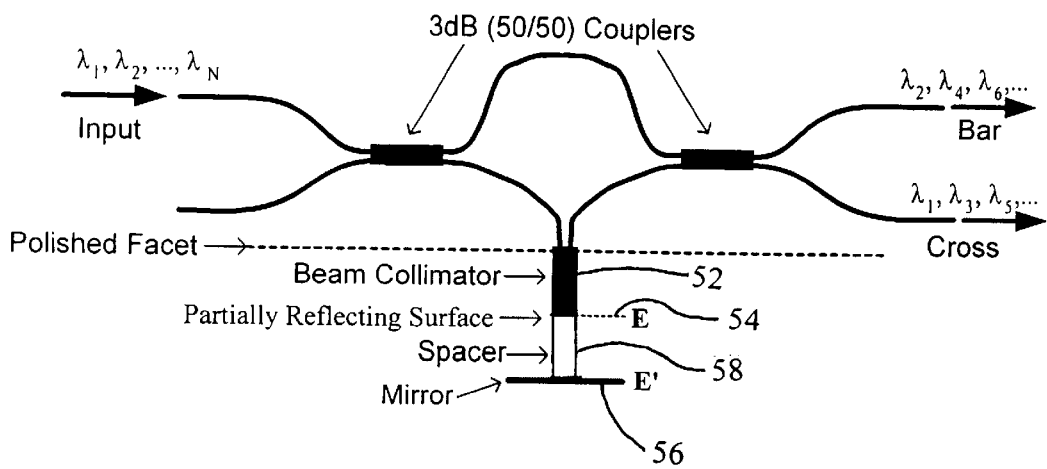
FIG. 5 is a schematic diagram of an alternative embodiment of a WDM interleaver/de-interleaver circuit based on a waveguide MZ-interferometer combined with a GT resonator in accordance with the invention wherein a micro-optic GT resonator is provided.

The operation of the Mach-Zhender Gires Tournois (MZGT) circuit of FIGS. 2, 4, and 5 is similar. These devices are polarization interleavers. Only one of vertical or horizontal polarized light of wavelength $\lambda 1, \lambda 2, \ldots \lambda N$ is launched into input port 1 of the coupler 20a. If only vertically or only horizontally polarized light is launched into the device at the output of the device wavelengths/channels are de-interleaved; channels corresponding to wavelengths $\lambda 2, \lambda 4, \lambda 6 \ldots$ are directed to one output port of the coupler 20c and channels corresponding to wavelengths $\lambda 1, \lambda 3, \lambda 5 \ldots$ are directed to the other output port of the coupler 20c.

Figure 6:
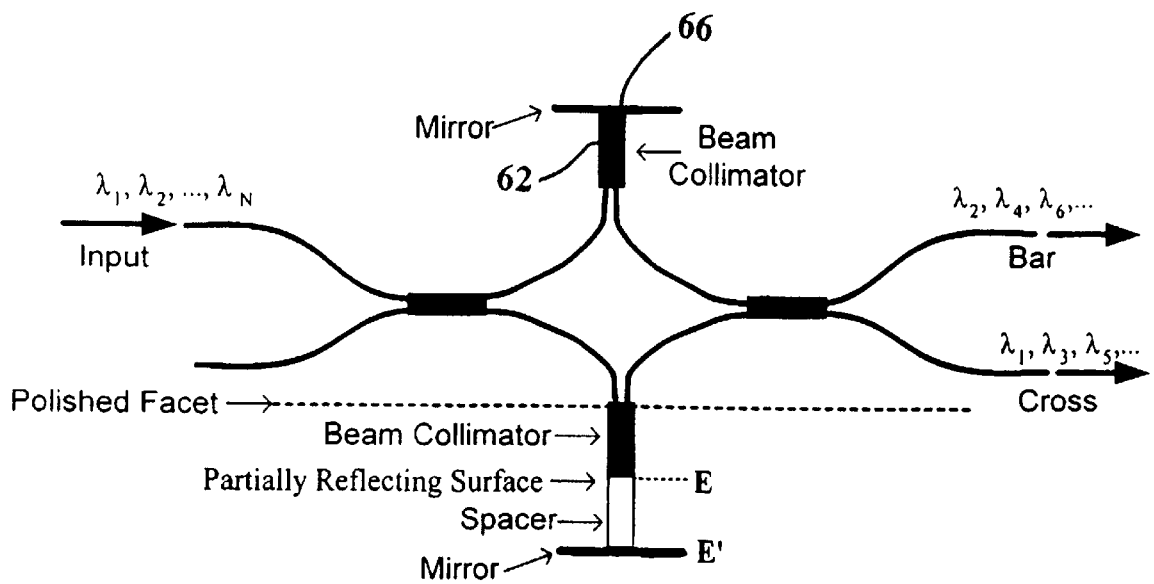
FIG. 6 is a schematic diagram of an alternative embodiment of a WDM interleaver/de-interleaver circuit based on a waveguide MZ-interferometer combined with a GT resonator in accordance with the invention having a mirror added to the upper arm of the MZ to balance the polarization-dependent behavior of the device.

If the input light is not horizontally or vertically polarized, the device will not function as a wavelength de-interleaver. Hence this device is useful in transmission schemes that rely on wavelength polarization interleaving. Although the circuit is shown for performing polarization interleaving, it can be used in an opposite direction to de-interleave channels as well. If light launched into the device is, for example polarized at 45 degrees, the output arms would both provide adjacent channels having $\lambda 1, \lambda 2, \lambda 3, \lambda 4 \ldots \lambda N$ wherein adjacent channels corresponding to these wavelengths would be orthogonally polarized, wherein the outputs would have inverse polarizations on each port for same channels. FIG. 6 which will be described in more detail hereafter, compensates for this behaviour such that the device is no longer polarization dependent.

Referring now to FIG. 4, an alternative embodiment is shown wherein the resonator is formed by employing two materials having different refractive indices. Light is partially reflected at the boundary of the two materials due to Fresnel reflection. The difference between the refractive indices has to be relatively high to achieve the desired reflectivities. a waveguide 41a having a refractive index n1 is directly coupled to a waveguide 42a having a refractive index n2. Waveguides 41b and 42b are disposed in parallel forming the GT resonator.

Another embodiment of the invention is shown in FIG. 5 which is a hybrid device where an MZ interferometer has been combined with a micro-optic GT resonator. The shorter arm 18a of the MZ is coupled to a beam collimator 52 such as a graded-index lens. The resonating cavity is formed of a partially reflecting spacer 54 having a reflectivity E separated by a mirror 56 having a reflectivity E' by a spacer 58.

FIG. 6 illustrates another embodiment of the invention similar to that of FIG. 5 however a beam collimator 62 and a mirror 66 are disposed in the pair of upper arms 68a and 68b. The circuits of FIGS. 6–8 provide embodiments of the invention wherein the device functions as a polarization-independent wavelength interleaver by way of having the mirror 66 and beam collimator 62 disposed in the upper arm.

Figure 7:
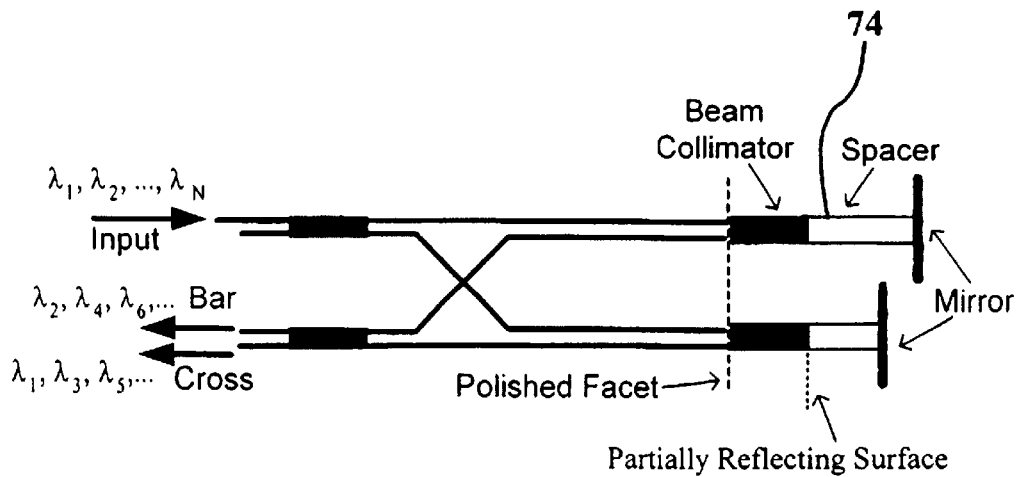
FIG. 7 is a schematic diagram of an embodiment of the invention showing a folded version of the device of FIG. 6; a spacer is introduced into the upper mirror to account for length difference between the two arms.

FIG. 7 is a folded version of the device shown in FIG. 6. An additional spacer 74 is disposed in the upper arm of the MZ to provide a required length difference between the two arms of the MZ.

Figure 8:
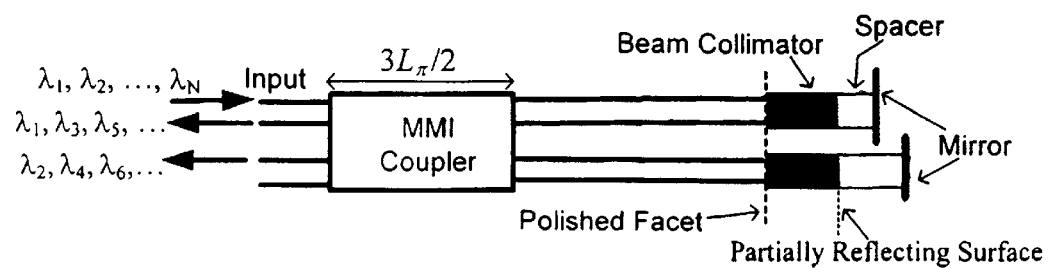
FIG. 8 is a device similar to that of FIG. 7 wherien the two 50/50 couplers have been replaced with a 4×4 MMI coupler of length 3 $L_{90}$ /2.

FIG. 8 illustrates an embodiment similar to that of FIG. 7, wherein a 4×4 MMI coupler of length $3 L_\pi/2$ replaces the two 50/50 couplers shown in FIG. 7.

Figure 9:
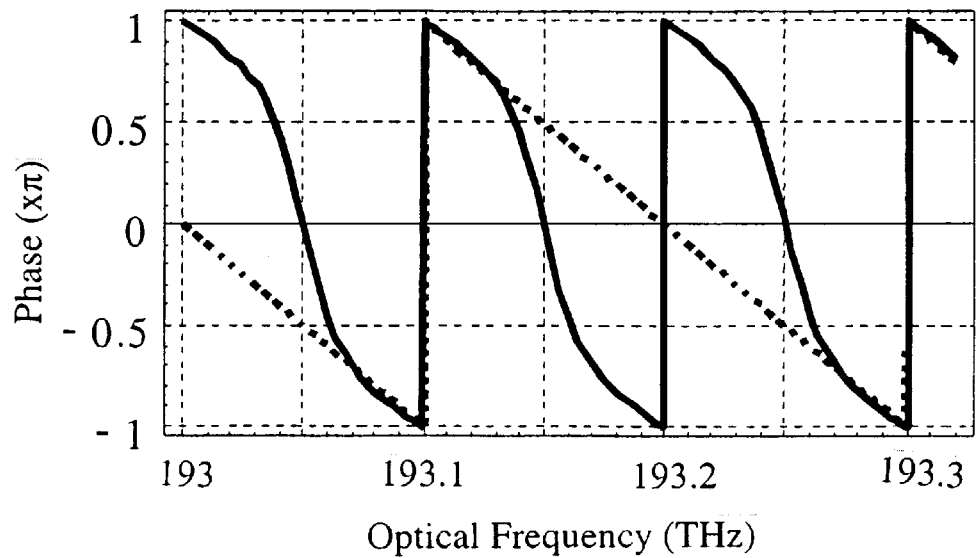
FIG. 9 is a graph of the optical fields of the MZ-resonator interferometer after the second 3 dB coupler.

FIG. 9 illustrates the spectral phases of the optical fields of the MZ-resonator interferometer after the second 3 dB coupler. The phase of the signal propagating within the longer arm of the MZ is a linear ramp; the other curve represents the phase response of the GT resonator.

Figure 10:
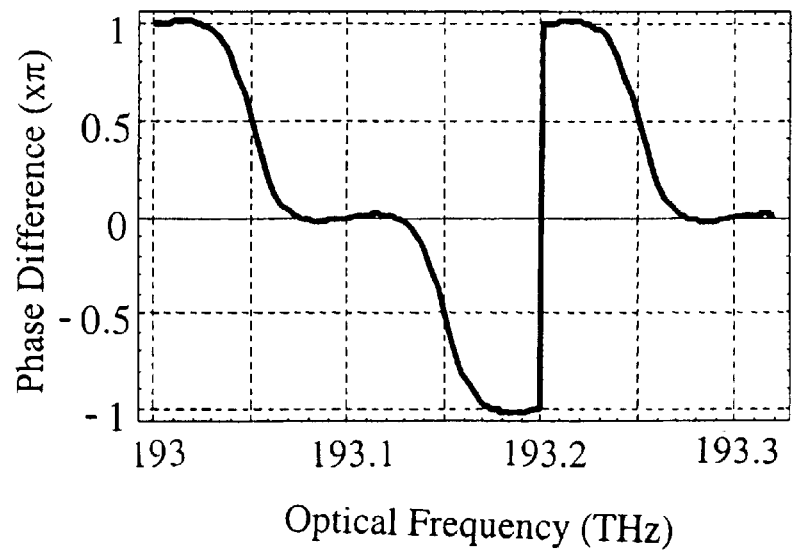
FIG. 10 is a graph depicting the difference between the optical fields of the MZ-resonator interferometer after the second 3 dB coupler.

FIG. 10 shows the phase difference between the two optical fields of the MZ-resonator interferometer after the second 3 dB coupler. The phase difference alternates between 0 and $+\pi$ over consecutive wavelength channels equivalent to the FSR of the resonator.

Figure 11A:
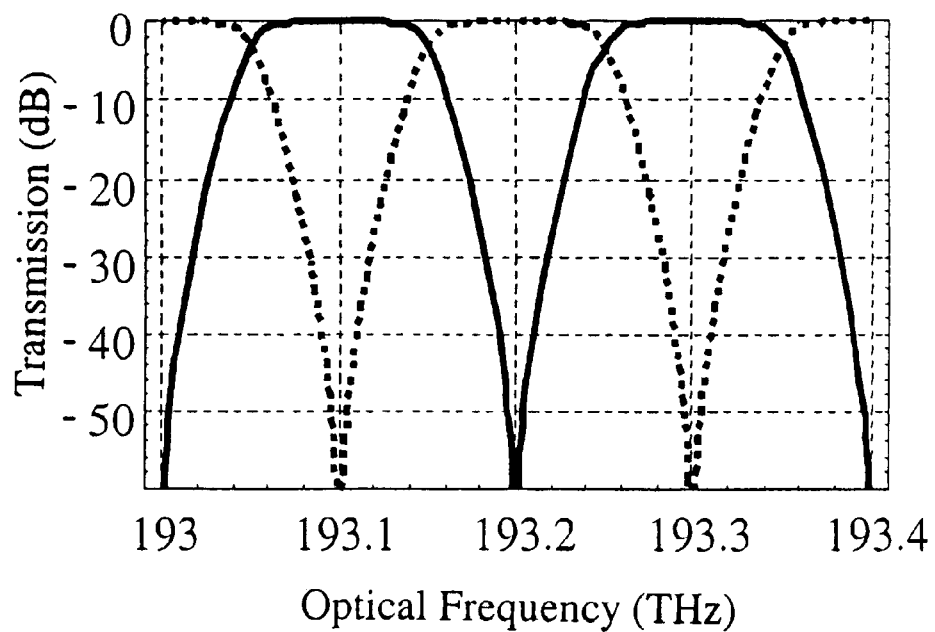
FIGS. 11a and 11b are graphs of spectral transmissions of the two de-interleaved signals $a_{aout1}$ and $a_{aout2}$ at the outputs of the MZ-resonator interferometer.
Figure 11B:
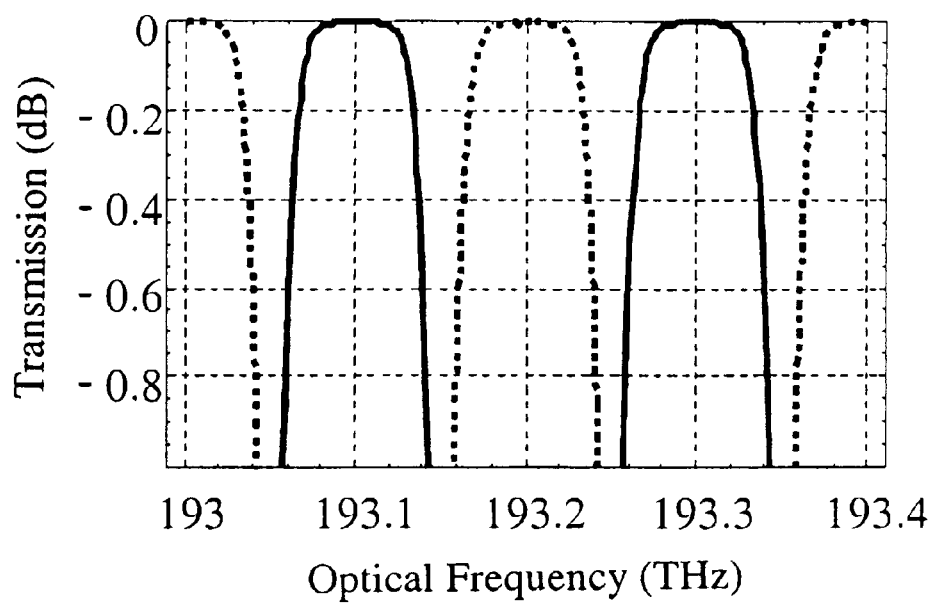

FIG. 11a shows the spectral transmissions of the two de-interleaved signals $a_{out1}$ and $a_{out2}$, at the output ports of the MZ-resonator interferometer. FIG. 11b illustrates an expanded view of −1 to 0 dB range shows the ripples in the response. The reflectivity $R_1$ of the partially reflecting plate is 0.1.

Figure 12A:
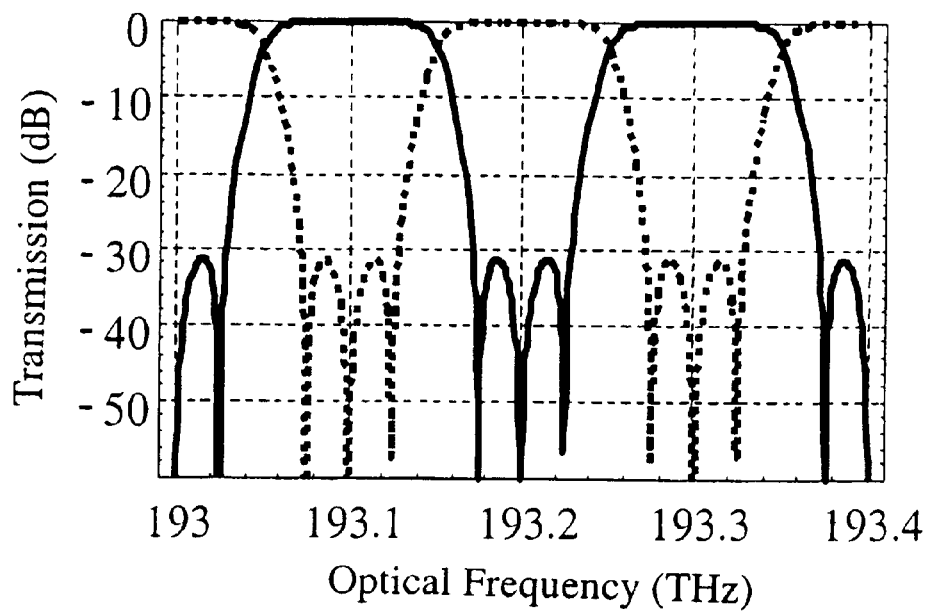
FIGS. 12a and 12b are graphs of the spectal transmissions of the two de-interleaved signals $a_{aout1}$ and $a_{aout2}$ at the outputs of the MZ-resonator interferometer.
Figure 12B:
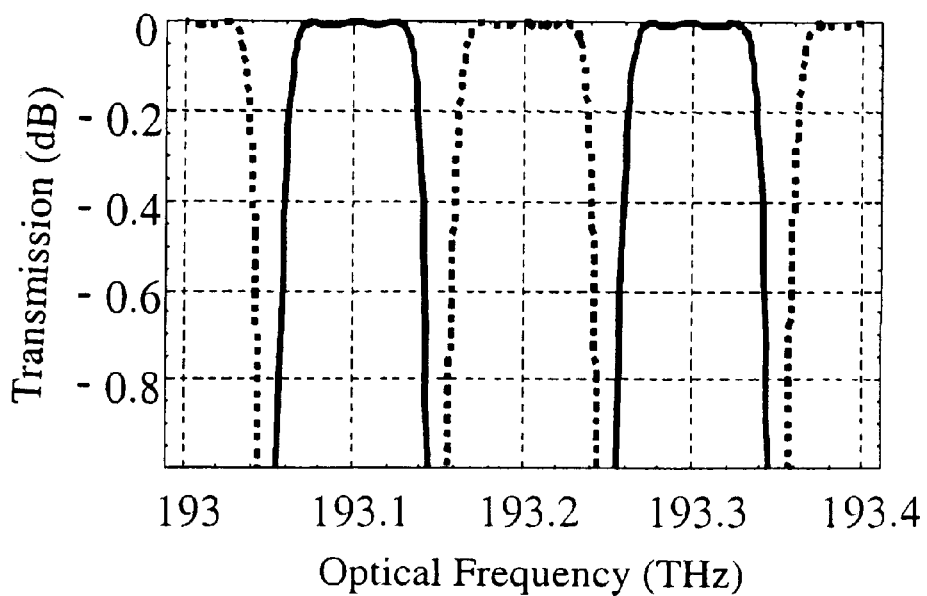

FIG. 12a shows the spectral transmissions of the two de-interleaved signals $a_{out1}$ and $a_{out2}$, for a different value of the reflectivity of the partially reflecting plate. It is seen from FIGS. 11a and 12a that by increasing the reflectivity of the partially reflecting plate, $R_1$, the response roll-off becomes steeper and both the channels bandwidth and cross-talk window increase while the side lobe levels also increase. This is illustrated more clearly in Table 1. Similar values for a well-designed coupler interferometer interleaver are shown in Table 2 to make the comparison more understandable. It is evident that the MZ-resonator interferometer has a steeper roll-off and, consequently better performance than the coupler interferometer in terms of cross-talk.

TABLE 1

Channel bandwidth and the cross-talk window for MZ-resonator interferometers with different values of the reflectivity of the partially reflecting plate, $R_1$. Note that all bandwidth values have been normalized against the channels spacing, which is taken as 1.

| $R_1$ | 1-dB BW | −15 dB x-talk window | −30 dB x-talk window |
|---|---|---|---|
| 0.1 | 0.85 | 0.635 | 0.34 |
| 0.17 | 0.89 | 0.736 | 0.57 |

TABLE 2

Channel bandwidth and the cross-talk window for a coupler interferometer.

| $R_1 = R_2$ | 1-dB BW | −15 dB x-talk window | −30 dB x-talk window |
|---|---|---|---|
| 0.17 | 0.8 | 0.51 | 0.22 |

In the various embodiments of the invention, the free spectral range (FSR) of the GT-resonator is given by $$FSR_{GT} = c/(2d)$$

where c is the speed of light in a vacuum and d is the optical length of the resonator cavity. The free-spectral range of the spectral response of the above interleavers are given by $$FSR_{INTERLEAVER} = c/(d)$$

Furthermore, the design of the aforementioned interleavers require that the optical length difference between the two arms of the MZ interferometer be exactly equal to the optical length, d, of the resonator cavity.

The GT resonator is placed on the shorter arm.

The interleavers described heretofore, in principle, all result in symmetric odd and even channels. Notwithstanding, the embodiment shown in FIG. 13 can be designed to provide either symmetric or asymmetric channels. In some instances, asymmetric interleaved channels are desired.

Figure 13:
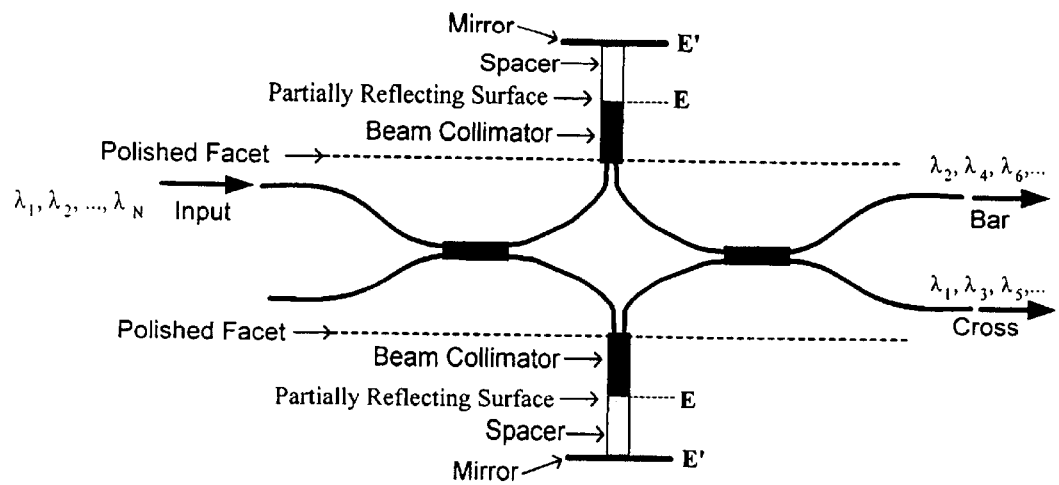
FIG. 13 is a schematic diagram of a WDM interleaver that can be designed to be either symmetric or asymmetric.

Referring now to FIG. 13, an interleaver is shown based on an MZ-interferometer combined with two GT resonators. The lengths of the cavities of the two GT resonators slightly differ from each other. The length difference between the two arms is approximately equal to the difference between the two lengths of the two cavities. The longer cavity is placed on the shorter arm. The free-spectral range of the spectral response of the interleaver is given by $$FSR_{INTERLEAVER} = c/(d_1+d_2)$$

where c is the speed of light in a vacuum and $d_1$ and $d_2$ are the optical path lengths of the two GT resonator cavities. The choice of values of $d_1$ and $d_2$ determine whether the interleaver is symmetric or asymmetric. The length difference between the two arms of the MZ and the reflectivity $R_1$ of the front fact of the GT resonator depend on the choice of values of $d_1$ and $d_2$. The interleaver is symmetric if $d_2-d_1 = (p+¼)\lambda$, where $\lambda$ is the wavelength and p is an integer number. Then the reflectivity $R_1=0.172$ and the length difference between the two arms of the MZ is equal to $(p+¼)\lambda$. This relation is true if the input coupler is a standard 2×2 coupler. If the input coupler is a centre-fed 1×2 MMI coupler or a Y-junction coupler, then the length difference between the arms is equal to $p\lambda$. In the optimum case, $p=0$. The interleaver would be asymmetric for all other values of $d_2-d_1$.

An advantage of the device of FIG. 13 compared with the device of FIG. 6 is that it requires temperature stabilization only in the GT cavity, whereas the device of FIG. 6, similar to an MGTI device requires temperature stabilization both in the cavity and in the arms.

Figure 14:
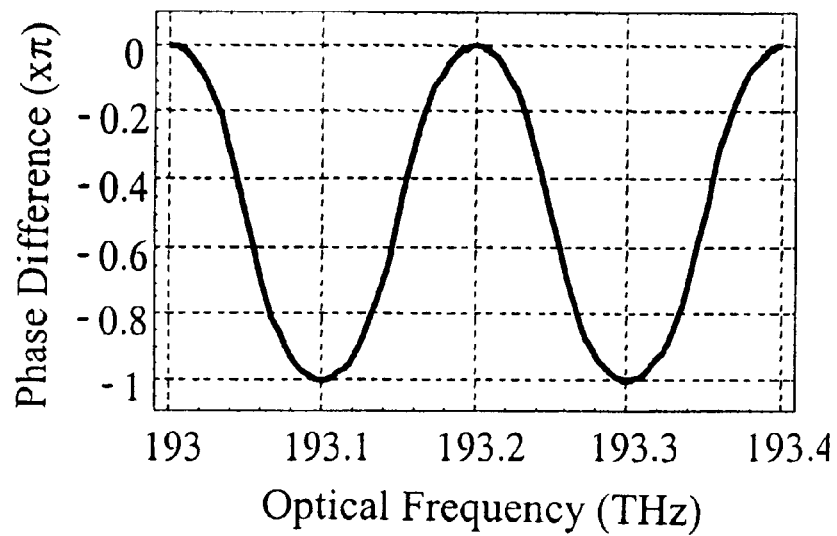
FIG. 14 is a graph of phase difference between the two optical fields of the interleaver 13 after the second 3 dB coupler.
Figure 15:
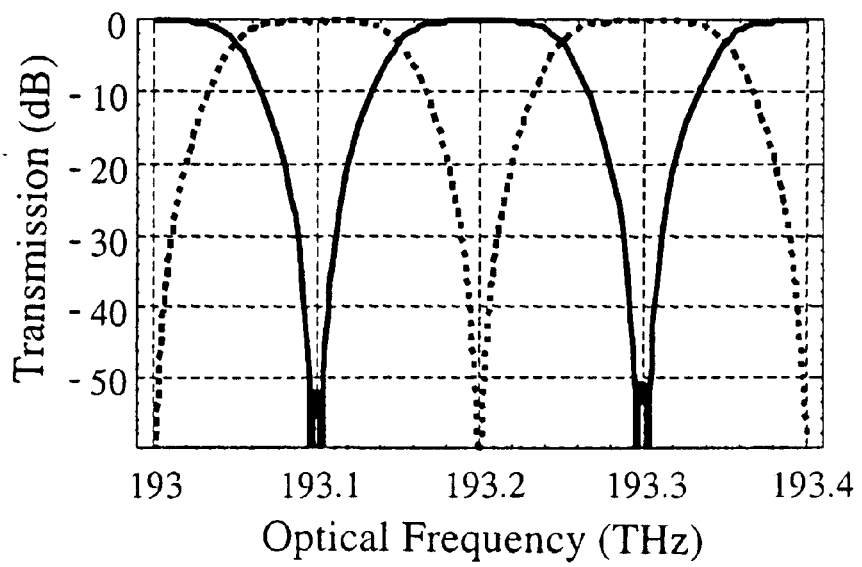
FIG. 15 is a graph of transmission versus optical frequency showing the spectral transmissions of the two de-interleaved signals at the output of the device of FIG. 13, wherein the device is designed to be symmetric.
Figure 16:
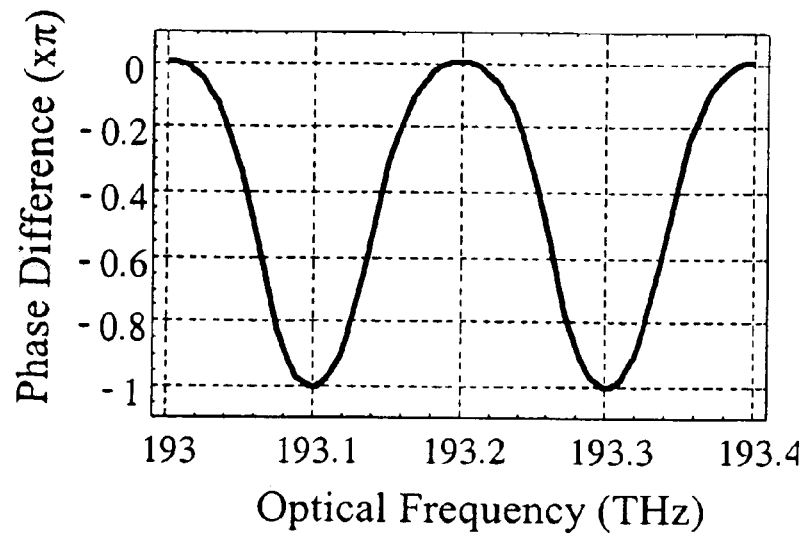
FIG. 16 is a graph of phase difference versus optical frequency depicting the phase difference between the two optical field of the interleaver in FIG. 13 after the second 3 dB coupler, wherein the device is designed to be asymmetric.
Figure 17:
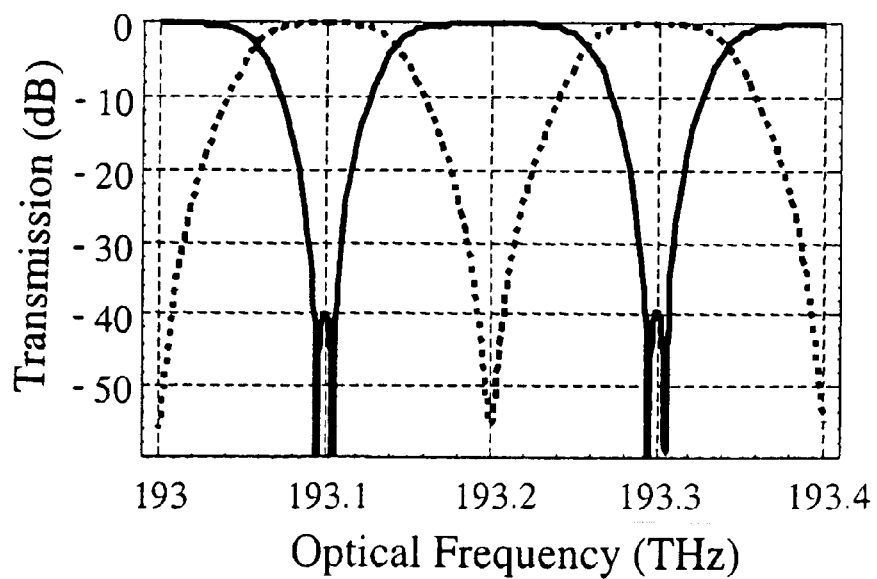
FIG. 17 is a graph of transmission versus optical frequency depicting the spectral transmissions of the two de-interleaved signals at the output of the device of FIG. 13, wherein the device is designed to be asymmetric.

FIG. 14 illustrates the phase difference between the two optical fields travelling through the device after the second 3 dB coupler. The phase difference alternates between 0 and $+\lambda$. FIG. 15 shows the spectral transmissions of the two de-interleaved signals at the outputs of the device. FIGS. 14 and 15 correspond to an interleaver that has been designed to be symmetric. Equivalently, FIGS. 16 and 17 correspond to a device that has been designed to be asymmetric.

Figure 18A:
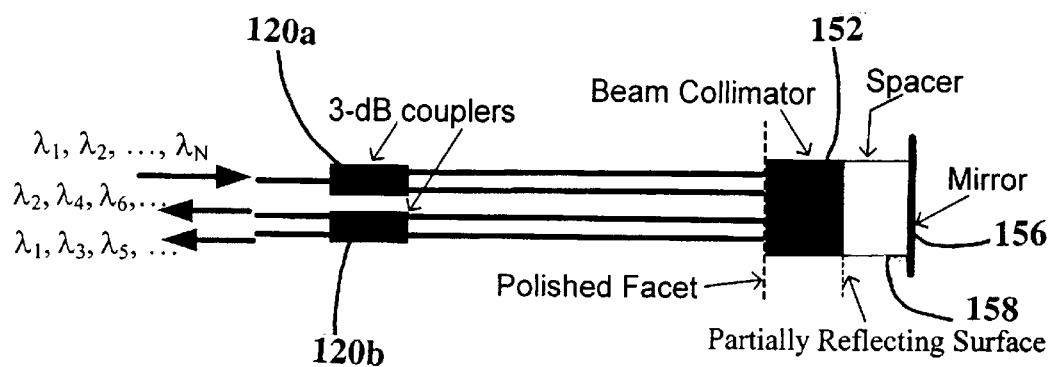
Figure 18B:
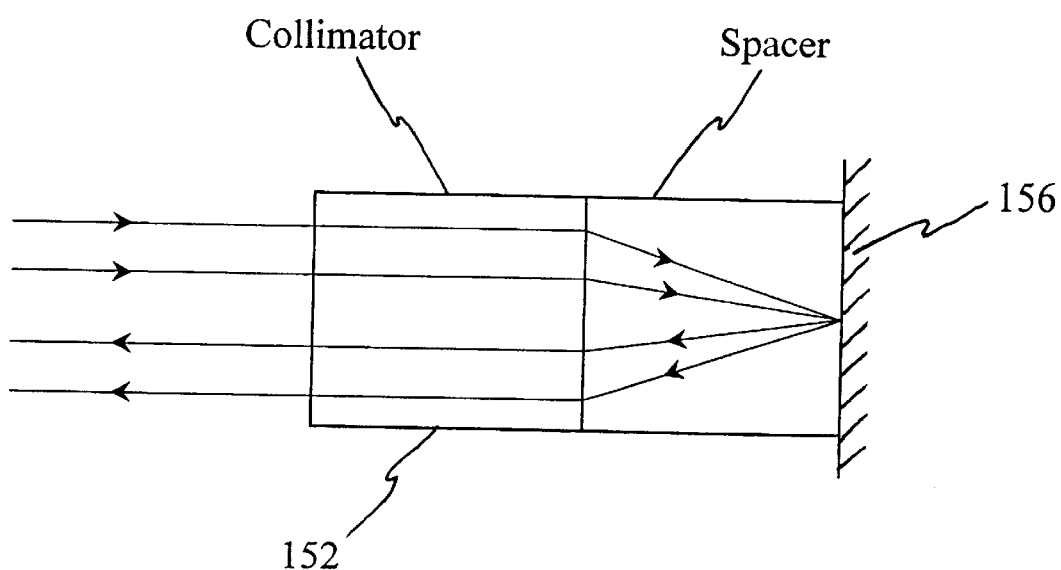

An alternative embodiment of the invention is shown in FIGS. 18a and 18b. In contrast to the embodiment shown in FIG. 13, this embodiment only requires a single GT resonator.

The locations of the four waveguides (or optical fibres) at the input of the beam collimator has to be chosen appropriately so that the two angled paths through the GT result in slightly different FSR's as required in the design. The first 3 dB coupler, preferably a 50/50 coupler has two output waveguides coupled directly to a single GT resonator consisting of a partially reflecting surface illustrated by a dotted line and having a mirror 156 at another end. Disposed between is a beam collimator 152 and a spacer 158.

Of course numerous other embodiments can be envisaged, without departing form the spirit and scope of the invention.

Furthermore, the monolithic waveguide devices described in accordance with this invention can be fabricated in such a way as to make them relatively temperature stable by permanently tuning the device. In any of these embodiments one of the arms, $a_r$ or $a_t$ can be doped, for example with germanium and subsequently exposed to UV light, in order to vary the refractive index of a particular section of the doped arm. Alternatively, exposing one arm to light of a suitable intensity and duration can in some instances yield a required refractive index change to permanently tune the device. This is a convenient method of permanently adjusting the phase relationship between the two arms $a_r$ and $a_t$ thereby yielding very temperature tolerant devices.

What is claimed is:

1. An interleaver/de-interleaver circuit comprising:
   a first coupler having an input port and at least two output ports;
   a second coupler having two input ports and two output ports, the at least two output ports of the first coupler being optically coupled with the two input ports of the second coupler;
   an optical cavity having a partially reflective surface having a reflectivity E at one end and a reflective surface at another end with a higher reflectivity E', the optical cavity being optically coupled to one of the at least two output ports of the first coupler and at one of the two input ports of the second coupler.

2. An interleaver/de-interleaver circuit as defined in claim 1, wherein the two couplers form a MZ interferometer.

3. An interleaver/de-interleaver circuit as defined in claim 1, wherein one of the at least two output ports of the first coupler is coupled to one of the two input ports of the second coupler via a waveguide disposed between said two ports.

4. An interleaver/de-interleaver circuit as defined in claim 1, wherein the first coupler and the second coupler are 50/50 couplers.

5. An interleaver/de-interleaver circuit as defined in claim 4, further comprising a third coupler coupled to one of the at least two output ports of the first coupler and one of the two input ports of the second coupler.

6. An interleaver/de-interleaver circuit as defined in claim 5, wherein the third coupler is a 50/50 coupler.

7. An interleaver/de-interleaver circuit as defined in claim 1, wherein the circuit is a polarization-wavelength interleaver for providing orthogonally polarized channels in a de-interleaving mode of operation and for providing in an interleaving mode of operation one of, a polarized stream of channels, and a stream of channels having each adjacent channels being orthogonally polarized.

8. An interleaver/de-interleaver circuit as defined in claim 1, wherein a mirror is provided at or within at least one arm of the coupler to balance the polarization dependent behaviour of the circuit.

9. An interleaver/de-interleaver circuit as defined in claim 8, further comprising a collimator for launching collimated light toward the mirror and for focusing light received from the mirror.

10. An interleaver/de-interleaver circuit comprising:
    a Mach-Zehnder interferometer having two optical branch paths between two 50/50 couplers, one of the two branch paths including an etalon within the path, such that light traversing said one of the two branch paths is coupled from one of the couplers to the other after resonating within the etalon, light traversing another of the two branch paths interfering with the light traversing the one of the two branch paths within one of the two couplers.

11. An interleaver/de-interleaver circuit comprising:
    a coupling means having a first input port $IN_1$ and at least two output ports $OUT_1$ and $OUT_2$;
    the coupling means having two other input ports $IN_2$ and $IN_3$ and two other output ports $OUT_3$ and $OUT_4$, the at least two output ports $OUT_1$ and $OUT_2$ being optically coupled with the two input ports $IN_2$ and $IN_3$;
    an optical cavity having a partially reflective surface having a reflectivity E at one end and a reflective surface at another end with a higher reflectivity E', the optical cavity being optically coupled to one of the at least two output ports $OUT_1$ and $OUT_2$ and at one of the two input ports $IN_2$ and $IN_3$.

12. An interleaver/de-interleaver circuit as defined in claim 11, wherein the coupling means is an at least 4×4 MMI coupler having a length $3 L_\pi/2$.

13. An interleaver/de-interleaver circuit as defined in claim 11, wherein the coupling means comprises two MMI couplers.

14. An interleaver/de-interleaver as defined in claim 13, further comprising a mirror coupled to two arms of the MMI coupler for lessening the polarization dependence of the interleaver/de-interleaver and for providing a substantially polarization insensitive interleaver/de-interleaver.

15. An interleaver/de-interleaver as defined in claim 14 further comprising a beam collimator for receiving light from one of the two arms and for providing a collimated beam to the mirror, said beam collimator for receiving reflected light from the mirror and for providing focused light to the other of the two arms.

16. An interleaver/de-interleaver as defined in claim 15, further comprising a a light transmissive spacer between the beam collimator and the mirror for providing a required path length difference between two main paths of MMI coupler.

17. An interleaver/de-interleaver as defined in claim 16, wherein each of the two main paths comprise two arms, each arm directly coupled to one of said ports.

18. An interleaver/de-interleaver comprising:
- a Mz-interferometer having arms, an input/output port and two output/input ports;
- a GT resonator optically coupled with an arm of the MZ-interferometer, the GT resonator for providing additional filtering and for lessening the sinusoidal shape of de-interleaved channels.

19. A method of providing orthogonally polarized de-interleaved channels comprising the step of:
- launching only one of vertical polarized light and horizontally polarized light into the device of claim 18, and receiving de-interleaved channels of light.

20. A method of providing light of orthogonally polarized adjacent channels, comprising the steps of:
- providing a stream of channelized light having a 45 degree linear polarization with respect to a first plane, said light lying in a second plane normal to the first plane, the first plane containing lines extending from the two output/input ports of the device defined in claim 18;
- launching said light into one of the two input/output ports; and,
- receiving light from at least one of the output/input ports.

21. A method of manufacturing an interleaver/de-interleaver circuit comprising the steps of:
- providing a Mach-Zehnder interferometer having two optical waveguides between two 50/50 couplers;
- providing an etalon optically coupled with one of the two waveguides, such that light traversing said one of the two waveguides is coupled from one of the couplers to the other after resonating within the etalon, light traversing another of the two waveguides interfering with the light traversing the one of the two waveguides within one of the two couplers; and,
- phase tuning the circuit by irradiating at least one of the two waveguides with light of a suitable intensity, wavelength and duration to effect a suitable refractive index change in said at least one of the two waveguides.

* * * * *